May 18, 1965 P. A. SCHWARZ ETAL 3,184,161
LOW ALTITUDE BOMBING HAND COMPUTER
Filed April 1, 1958 6 Sheets-Sheet 2

INVENTORS
PAUL A. SCHWARZ
RICHARD L. KRUMM
BY
ATTORNEYS

INVENTORS
PAUL A. SCHWARZ
RICHARD L. KRUMM

May 18, 1965  P. A. SCHWARZ ETAL  3,184,161
LOW ALTITUDE BOMBING HAND COMPUTER
Filed April 1, 1958  6 Sheets-Sheet 4

INVENTORS
PAUL A. SCHWARZ
RICHARD L. KRUMM
BY
ATTORNEYS

May 18, 1965 P. A. SCHWARZ ETAL 3,184,161
LOW ALTITUDE BOMBING HAND COMPUTER
Filed April 1, 1958 6 Sheets-Sheet 5

INVENTORS
PAUL A. SCHWARZ
RICHARD L. KRUMM
BY
ATTORNEYS

United States Patent Office 3,184,161
Patented May 18, 1965

3,184,161
LOW ALTITUDE BOMBING HAND COMPUTER
Paul A. Schwarz, Pittsburgh, Pa., and Richard L. Krumm, Atwater, Calif., assignors to the United States of America as represented by the Secretary of the Air Force
Filed Apr. 1, 1958, Ser. No. 725,761
4 Claims. (Cl. 235—89)

The Low Altitude Bombing System or "LAB" as it is known affords a method of attacking ground targets when low ceiling, poor visibility and target defense rules out the use of conventional dive and toss bombing techniques. In performing the Low Altitude Bombing System maneuver the attack is planed before hand. The pilot approaches the target at a specific predetermined altitude and airspeed, and while maintaining wing-level attitude uncages a vertical gyroscope which will control the pull-up angle at which the bomb device will release. He flies directly toward the target over a preselected identification point or "IP" located at a known distance from the selected target and depresses the bomb button when directly over the "IP" which starts a preset timer in the aircraft which determines a preselected pull-up point distance or time between the "IP" and the target. When the timing cycle is completed the reticle in his gunsight is extinguished by the timer and he starts a pull-up at a specific acceleration or number of g's. He maintains wing-level attitude and a constant predetermined pull-up acceleration, using his aircraft attitude indicator with his aircraft accelerometer. As he passes through the predetermined pull-up angle as preset in the vertical gyro the bomb device is automatically released and describes a known or preselected trajectory path from the point of release in the pull-up toward the target. The bomb device has a timer which detonates the bomb at the calculated end of its trajectory path, preferably at some predetermined altitude above the target. This timer may be started automatically by release of the bomb device or when the pull-up timer is started over the "IP." He continues his pull-up through a half loop, rolling out at the top to escape the heat of the blast from the bomb device. It is essential, during the maneuver, that the pilot fly his aircraft within extremely close tolerances as very slight deviations from the planned flight path exert marked effects on the bombs trajectory toward the target. Anyone of a number of variables can exert a substantial influence on the bomb trajectory. Determination of the gyro release angle setting, for example, requires simultaneous attention to the variables of approach airspeed, pull-up acceleration, release angle, burst height, gross weight of the aircraft at target, target attitude, approach altitude, and temperature and pressure at bomb release altitude.

The computer of the present invention was constructed to quickly, easily and accurately determine the essential relative values of said variables in their effective relation to each other whereby when certain conditions are known such as the desired burst height above the target airspeed, temperature and pressure etc., the computer can be quickly adjusted to predetermine the remainder of the essential variable so that the bombing mission can be planned in a minimum amount of time and with maximum accuracy.

An object of the present invention is to provide a circular type of computer to replace the present method of solving LABS bombing problems from complicated tables, figures and data with a substantially more precise, accurate and faster technique.

The computer as shown comprises two parts. The computer proper consists of two transparent rectangular plastic base plates separated by spacers in parallel spaced relation to provide a rectangular pocket or receptacle therebetween. On each of the plates a circular opaque disk or wheel is pivoted. The wheels are opaque except for transparent windows through which reference figures on insert cards are read or noted. The second part of the computer is a pack of insert cards or panels which are insertable in the pocket between the two base plates. These cards have predetermined essential reference data on both sides for registration with the windows, lubber lines and pointers on the wheels as the wheels are rotatably adjusted, and each card satisfies certain selected mission conditions. One insert card is selected which satisfies certain mission conditions and this is inserted between the two base plates of the computer. Solving the bombing problem is accomplished by turning the wheels or disks to certain desired values and reading gyro and pull-up timer setting through the windows and noting the other tabulated data on the cards located beyond the periphery of the wheels. The insert cards yield gyro release angle and timer settings for various combinations of approach true airspeed, pull-up acceleration, release angle, approach altitude, burst height, gross weight, and pressure and temperature at bomb release altitude.

Mission conditions are the fixed boundaries within which the pilot must plan his attack and they remain constant throughout all computations and therefore are an integral part of the information data entered on the computer insert cards. A material change in any of these conditions requires an alternate pack of insert cards. These conditions are: "Approach True Airspeed" (TAS); pull-up Acceleration in number of g's; Release Angle, Burst Height; and Gross Weight of Aircraft at Target.

The Low Altitude Bombing System, known as LABS, is being used extensively by fighter bombers for the delivery of atomic bombs and other high explosive devices on ground targets and under the now existing system the pilot must enter two tables and five charts, and perform ten arithmetic computations. These charts are uniformly difficult to read, titles to the tables are obscure and scale values of ordinates and abscissas are not clearly marked. Some charts are subject to substantial error because of the necessity for estimated curvilinear interpolations. There is no cross check on computations and, since the accuracy of certain figures is contingent upon the accuracy of preceding readings or calculations, a single error can be carried through undetected, also the present charts are unwieldy and must be unfolded before they can be identified, also they are not equally accurate in reproduction.

Referring to the drawings:

FIGURE 1 illustrates one side of the improved computer with one of the insert bombing data cards inserted and the adjustable reference dial or wheel on that face adjusted for registration with 750 mb. pressure indicia on the insert part of the dial and the transparent mounting panel for that dial being broken away to disclose a portion of the concentric reference scale indicia for the different temperatures at the target values.

Figure 1:
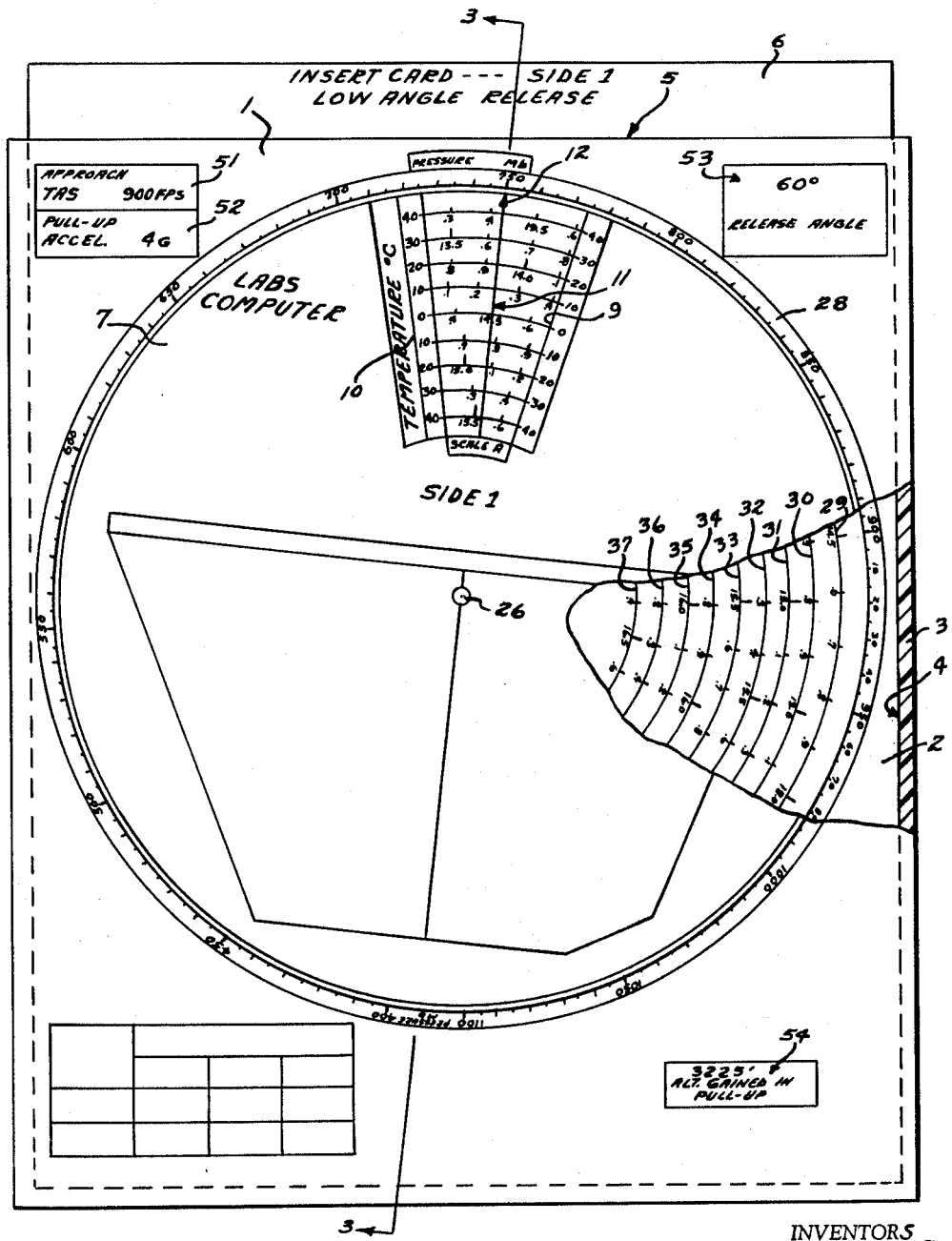
Figure 2:
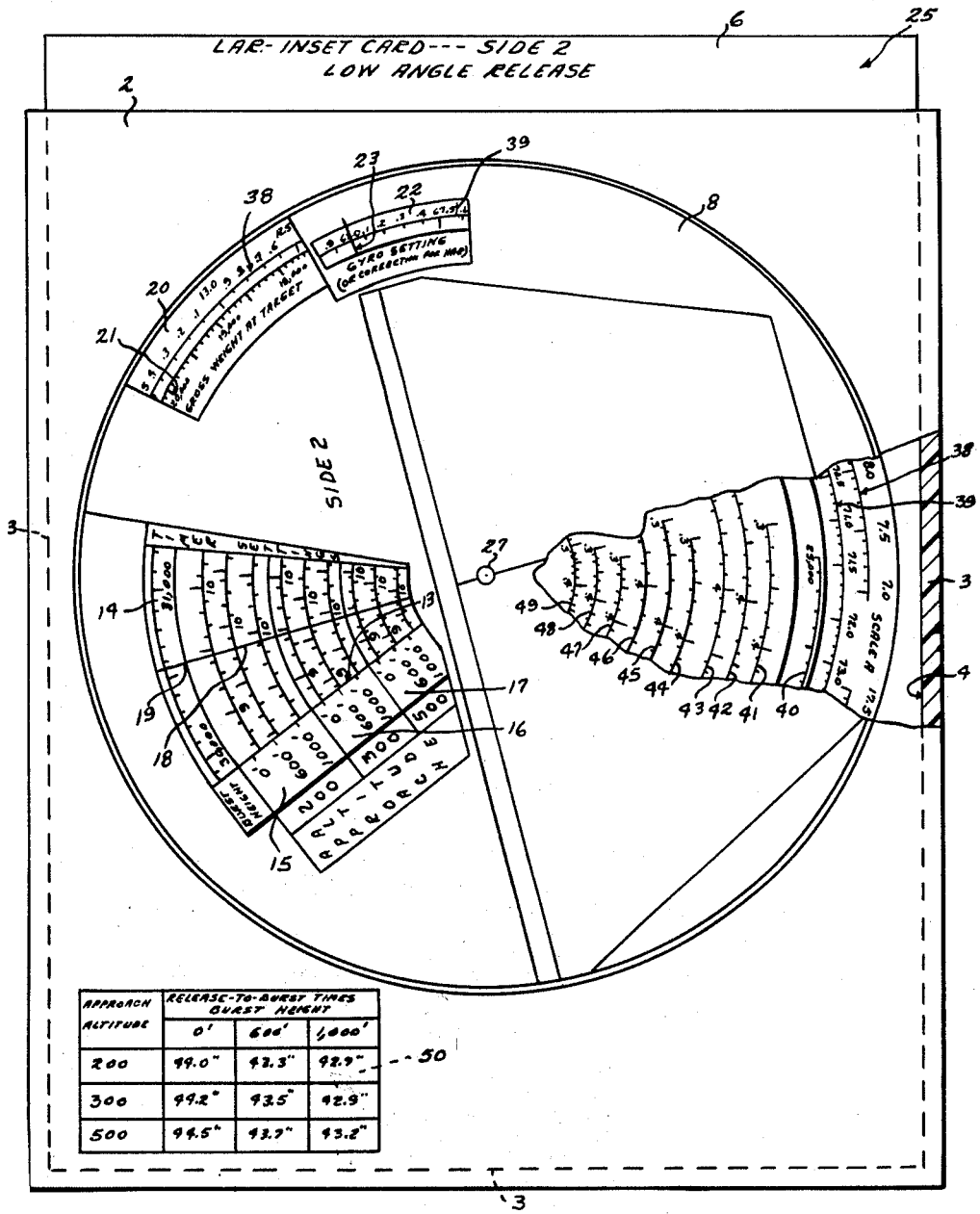
FIGURE 2 is a view of the reverse side of the computer, also shown is the additional bombing data information on the reverse side of the insert shown in FIGURE 1, parts of the dial and panel being broken away to show portions of the bombing data information on the reverse side of the insert sheet or card.

The reference numerals 1 and 2 denote the first and second sides of a pair of substantially rectangular transparent panels which are closely spaced apart in overlying parallel relation by spacer means 3 therebetween extending around the bottom and opposite sides or edges of the panels to provide a rectangular insert card receiving pocket 4 which is open at its top 5 to receive one of a plurality of bombing data information reference cards 6. The insert cards 6 are each shaped to snugly fit the pocket 4 so as to dispose the inserted card 6 in the pocket in precise fixed relation to the panels 1 and 2.

A pair of opaque circular disks or wheels 7 and 8 are concentrically disposed for rotative adjustment on the outer surfaces of the panels 1 and 2 within the outer perimeters thereof so as to expose certain fixed predetermined bombing data information on the insert cards located outwardly of the perimeter of the disks.

A first one of the opaque disks 7 is provided with a radial window 9 which extends inwardly from the periphery of the disk, the window being radially indexed at 10 to indicate predetermined reference temperatures from at least +40° C. to −40° C. A radial reference lubber line 11 extends across the center of the window 9 and terminates at the periphery of the disk in a pressure index reference pointer 12.

The second one of said disks or wheels 8 is provided with 3 windows, a first radial window 13 located intermediate its center and periphery having a selected initial point to the target ditsance reference pointer 19 which is radially indexed at 15, 16 and 17 to indicate at least 3 different aircraft approach altitudes, in this case 200 ft., 300 ft. and 500 ft., each of these being subindexed to indicate at least three predetermined different bomb burst heights indicated at 15ª, 15ᵇ, 15ᶜ; 16ª, 16ᵇ, 16ᶜ; and 17ª, 17ᵇ and 17ᶜ, asid window 13 having a radial "initial point to the target" distance indexing pointer 19 for registration with initial point to target distance data on an insert card 6, said second disk 8 having a second curved window 20 at its periphery disposed in laterally oxset relation to the first window 13, this window being indexed circumferentially at 21 to indicate predetermined gross weights of the bombing aircraft at the target.

The second disk 8 has a third curved window 22 disposed in circumferentially offset relation to said second window 20 and spaced inwardly from the periphery of the said second disk. This third window 22 has a radial gyro bomb release angle determining reference lubber line 23, disposed to register with predetermined gyro bomb release angle setting information indexed on the insert cards.

The insert cards 6 each have a first side 24 disposed to face the back of said first disk 7 and a second side 25 disposed to face the back of the second disk 8, said first and second sides 24 and 25 of said insert cards 6 each having a plurality of concentric circles or rings of predetermined bombing data information arranged thereon concentric to the centers of the disks when the selected insert card is inserted in the pocket 4 so as to selectively register with said windows 9, 13, 20 and 22 aforesaid.

The first side 24 has an outer circle of pressure "mb." at the target indicia 28 thereon disposed to surround the periphery of said first disk 7 for selective registration with the pointer 12 at the outer end of the lubber line 11 and a plurality of corelated concentric rings of reference scale indicia 29, 30, 31, 32, 33, 34, 35, 36 and 37 are disposed thereon inwardly of the periphery of said first disk 7, each of said circular reference scales being disposed for selective registration through said first disk radial window 9 at said lubber line 11 in that window with one of said predetermined temperature reference values at the target indicia 10.

The second side 25 of each insert card has a first concentric, circular outer reference scale 38 indexed thereon to correspond to values on the aforesaid circular reference scales 29 and 37 on said first face of said insert card and is disposed for selective registration with said aircraft gross weight at the target reference indicia 21 on said second window 20. The second side 25 has a second corelated concentric circular gyro bomb release angle indicia scale 53 disposed inwardly of the outer annular reference scale 38 for registration with the lubber line 23 on the third curved window 22 to denote gyro release angle setting corrections, said second side 25 of the insert cards 6 has a third concentric circular "initial point to target" distance reference scale 40 thereon disposed inwardly of said gyro bomb release angle indicia scale 39 for selective registration with said initial point to target distance pointer 19, said side 25 also having a plurality of circular predetermined timer setting indicia scales 41, 42, 43, 44 concentrically disposed within the "initial point to the target" distance reference scale 40 for indicating predetermining timer settings for selective registration with the lubber line 18 in said first radial window 13 on the second disk 8, to compensate for variations in the selected distances, said second side 25 of the insert card 6 also having a predetermined tabulated release angle to burst time indicating indicia table 50, which is continuously displayed thereon through the panel 2 beyond the periphery of said second disk 8, said first side 24 having predetermined true airspeed reference indicia 51 required for the particular mission, also pull-up acceleration in number of g's data 52, selected gyroscope bomb release angle setting indicia 53, and predetermined altitude gained in pull-up information, all disposed thereon for continuous observation through said panels 1 beyond the periphery of the first disk 7.

Toss bombing mission conditions are the boundaries within which the pilot must plan his attack and they remain constant throughout all computations and they are therefore continuously displayed beyond the perimeter of disks 7 and 8 as follows:

(a) Approach True Airspeed (at 51)
(b) Pull-up Acceleration (at 52)
(c) Approach altitudes and corresponding burst heights (at 15, 16 and 17)
(d) Gyroscope Bomb Release Angle (at 53) subject to slight corrections according to atmospheric and weight conditions
(e) Altitude gained in pull-up (at 54).

Target altitude enters into the computations to find the bomb release altitude, also aircraft gross weight over target, indexed at 21, and temperature and pressure are variables provided for on cooperating reference scales 10 and 28 for obtaining a predetermined numerical reference figure on one of the concentric reference scales 29 to 37. When the pointer 12 is set opposite a predicted pressure mb. the target and the predicted temperature index 10 under lubber line 11 a predetermined reference index number on the scale opposite the temperature index is noted for adjusting the second disk 8 with respect to the opposite face 25 of the selected insert card 6.

The face 25 of the insert card is provided with an outer ring 38 of reference index numbers corresponding in values to the numbers in the scales 29 to 37.

The corresponding reference number on the scale 38 as indicated on scales 29 to 37 opposite the temperatures selected is set opposite the gross weight indicia 21 in the second window 20. This provides the initial reference setting of the disk or computer wheel 8. The exact gyro bomb release angle setting is now read or noted from scale 39 in the third window 22 opposite the lubber line 23. This gives the corrected gyro release angle setting for the selected mission.

In order to obtain the timer setting for determining the elapsed time from the initial point to be crossed toward the target to the point of initiating the pull-up as specified at the number of "g's" specified the second disk or computer wheel 8 is now adjusted to dispose the arrow 19 on the lubber line 18 on the selected initial point to target distance on the circular scale 40 on the side 25 of the insert card 6. The rings of timer setting indicia 41 to 49 indicate predetermined timer setting variables which are dependent on variations in the initial point to pull-up point distances, and the selected burst height for the bomb device, and the selected approach altitude for the aircraft. When the arrow 19 is set on the selected initial point to the target distance indicia on the scale 40 the correct timer setting for indicating the pull-up point is read off the timer setting scales 41 to 49 which is under the lubber line 18 and opposite the burst height selected in the window at 15, 16 or 17, which is opposite the approach altitude selected.

Release of the bomb device to the burst time thereof, for the conditions set forth on the particular insert card selected, is tabulated at 50 in the lower left hand corner of the second side 25 of the cards and is continuously visible through the panel 2 beyond the periphery of the disk or wheel 8. Likewise selected approach true airspeed and pull-up acceleration for a particular mission which is covered by a particular insert card are not variables and therefore continuously displayed at 51 and 52 in the upper left hand corner of the cards beyond the periphery of the adjustable first disk or wheel 7.

Altitude gained in pull-up for the mission covered by the selected card for the given true airspeed, pull-up acceleration and g's and gyro release angle is not a materially variable and this "altitude gained in pull-up" is also displayed in the lower right hand corner of the first side 24 of the insert cards 6, beyond the periphery of the disk or wheel 7.

Figures 3, 4:
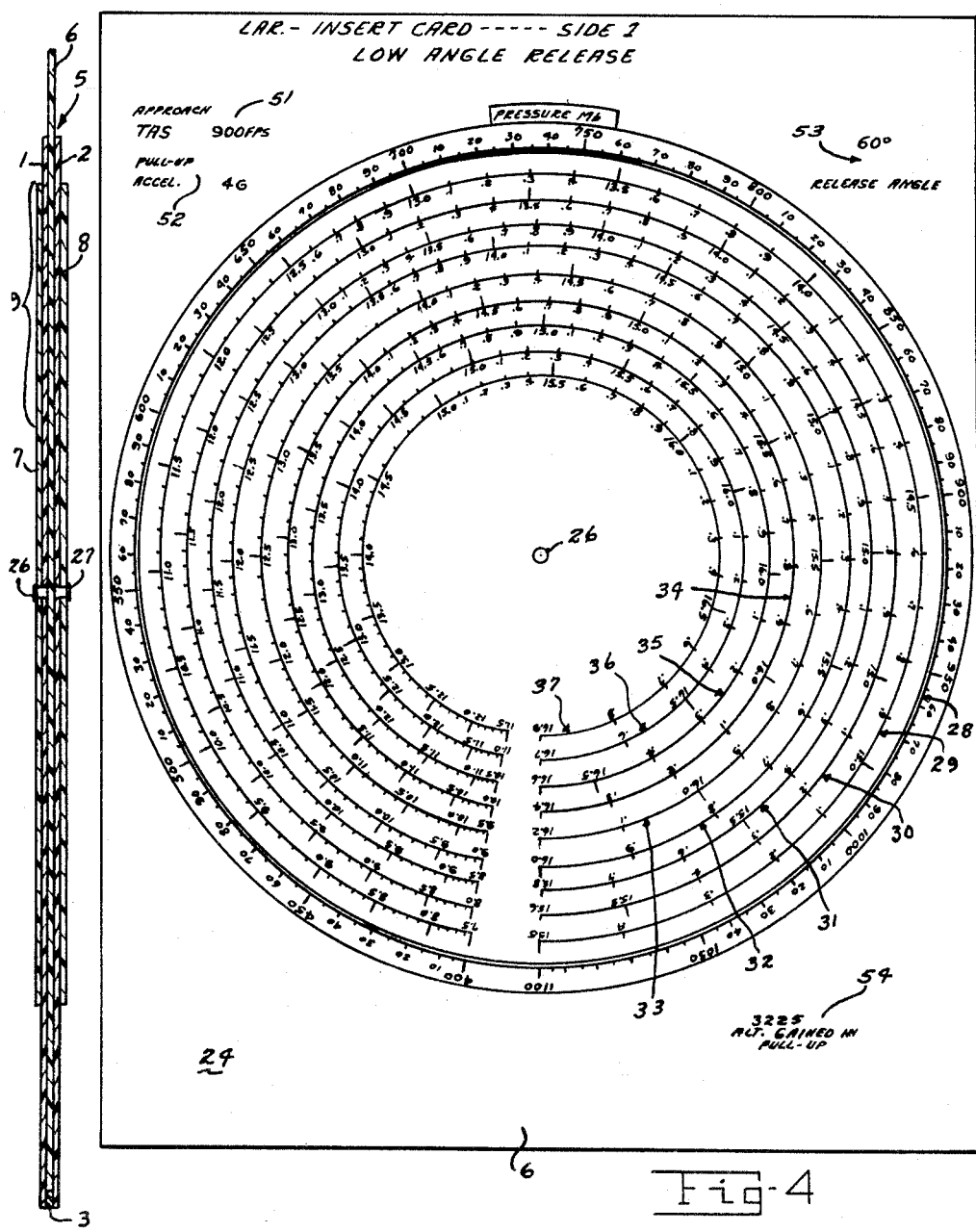
FIGURE 3 is a vertical section taken about on line 3—3 of FIGURE 1.
FIGURE 4 is a detail view of one side of one of the insert cards such as disclosed in FIGURES 1 and 2.
Figure 5:
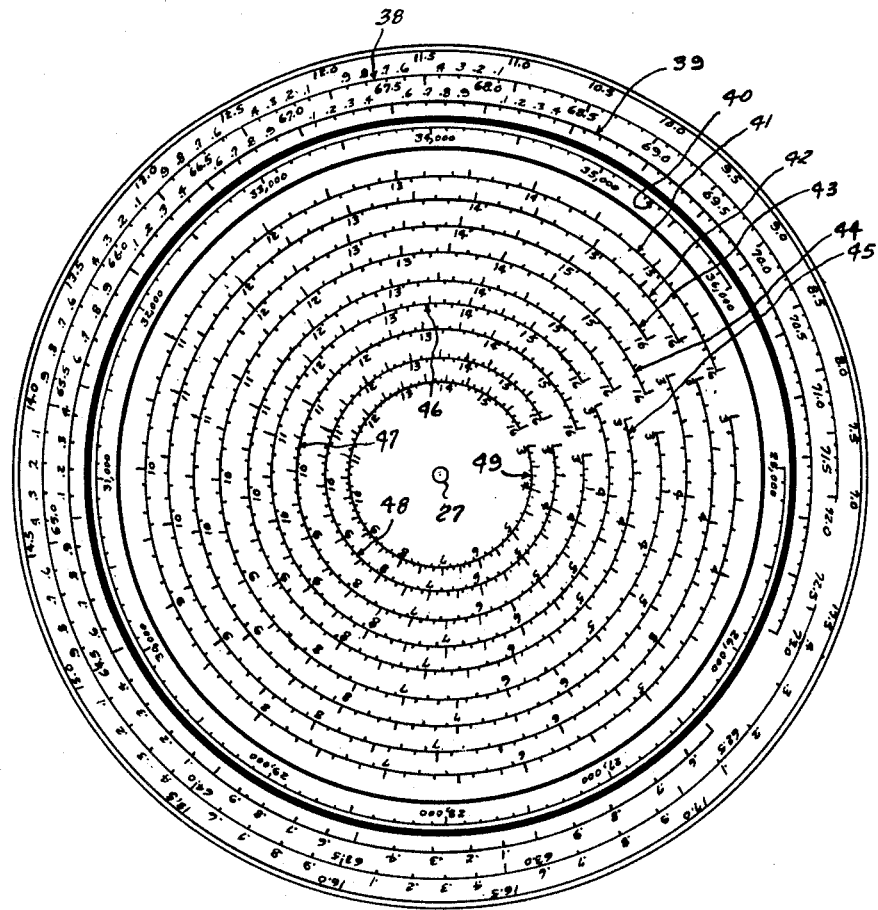
FIGURE 5 is the reverse side of the insert card shown in FIGURE 4.
Figure 6:
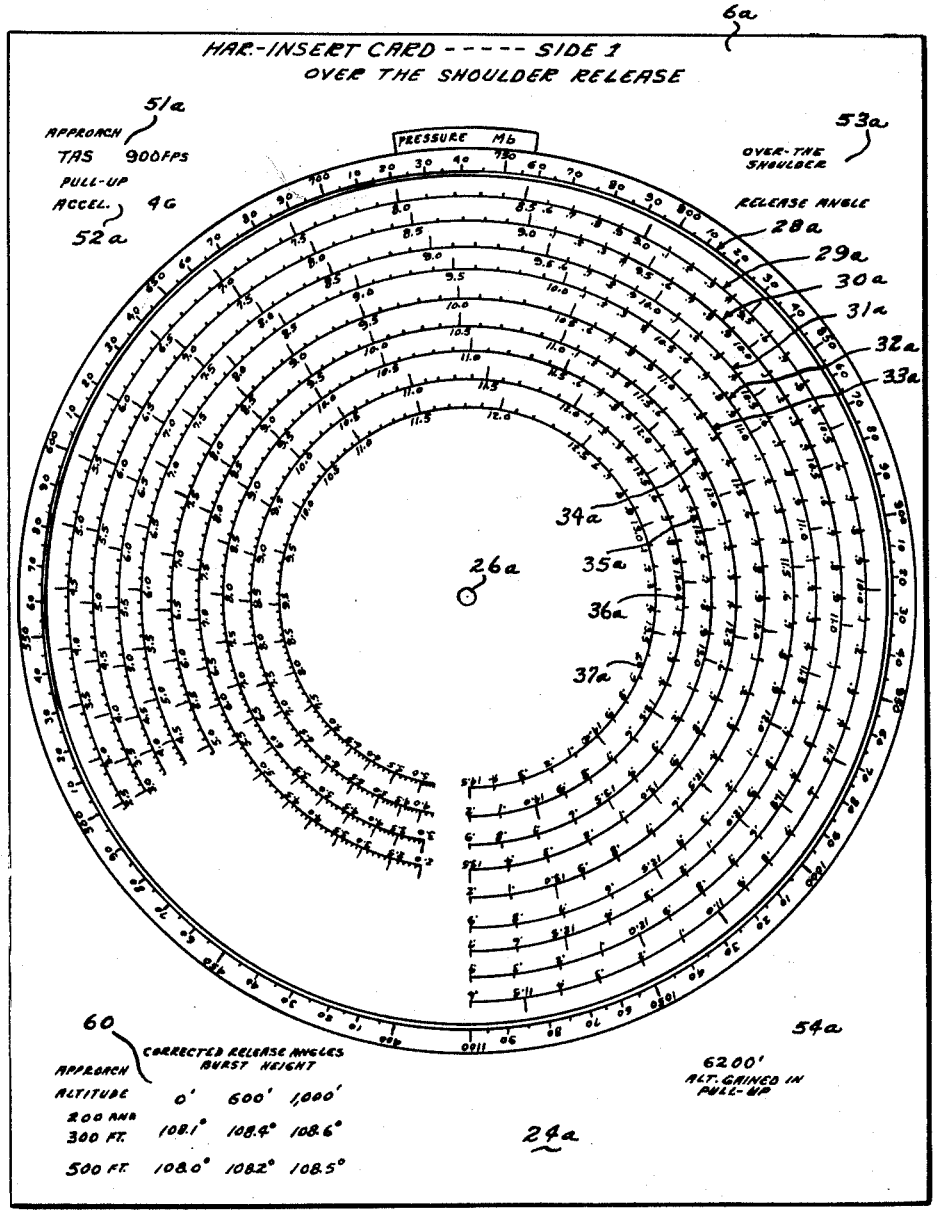
FIGURE 6 is a detail view of another insert card such as used for a High Angle or "over the shoulder" release.

The pilot therefore makes note of the bombing mission conditions and selects an insert card 6 which covers the conditions, for instance the card or insert 6 shown in FIGURES 5 and 6 is selected. Assuming that mission conditions are as follows: Release Angle 60°; Approach True Airspeed 900 f.p.s. (feet per second ); pull-up acceleration 4 g's; burst height 600'; gross weight of aircraft at target 20,000 lbs.; approach altitude 200; target altitude zero; an insert card for 60° pull-up angle, 900 f.p.s. TAS, 4 g's acceleration, such as shown in FIGURES 4 and 5, is selected and inserted in the pocket 4, between the transparent panels 1 and 2.

The IP to target distance is determined or known, assuming it to be 32,000 ft. Also forecast temperature and pressure is obtained, assuming temperature and pressure to be 40° C. and 750 mb., the index arrow 12 is placed opposite 750 mb. on scale 28, and a variable reference number is noted on scale 29 under 40° temperature at side of window 9 under lubber line 11. This reference figure under the assumed conditions is about 13.42.

The computer is now turned over and disk 8 is adjusted to dispose the gross weight of the aircraft (20,000 lbs.) in the second window 20 opposite the just mentioned reference figure (of 13.42) but on scale 38. The corrected gyro setting for bomb release angle is now noted in third window 22 under lubber line 23, which is 67.5°.

In order to determine the timer pull-up indicating setting for this mission the disk 8 is now adjusted to dispose the pointer 19 on the IP to target distance (32,000 feet) on scale 40 and the timer setting is noted under lubber line 18, opposite the selected approach altitude 200' and burst height 600'. When a timer is being used, the computer supplies the correct setting directly. This would be on scale 42 at 12.5 seconds; in order words timer setting would be 12.50 seconds under the conditions. When an intervalometer is used this reading must be corrected by adding .23 second. Bomb release to burst time is read directly from tabulated table 50 of the insert card. At 200' approach altitude and 600' burst height the release to burst time for the aircraft to escape from the blast of the bomb device would be 42.5 seconds. The foregoing is for LABS low angle bomb releases.

Figure 7:
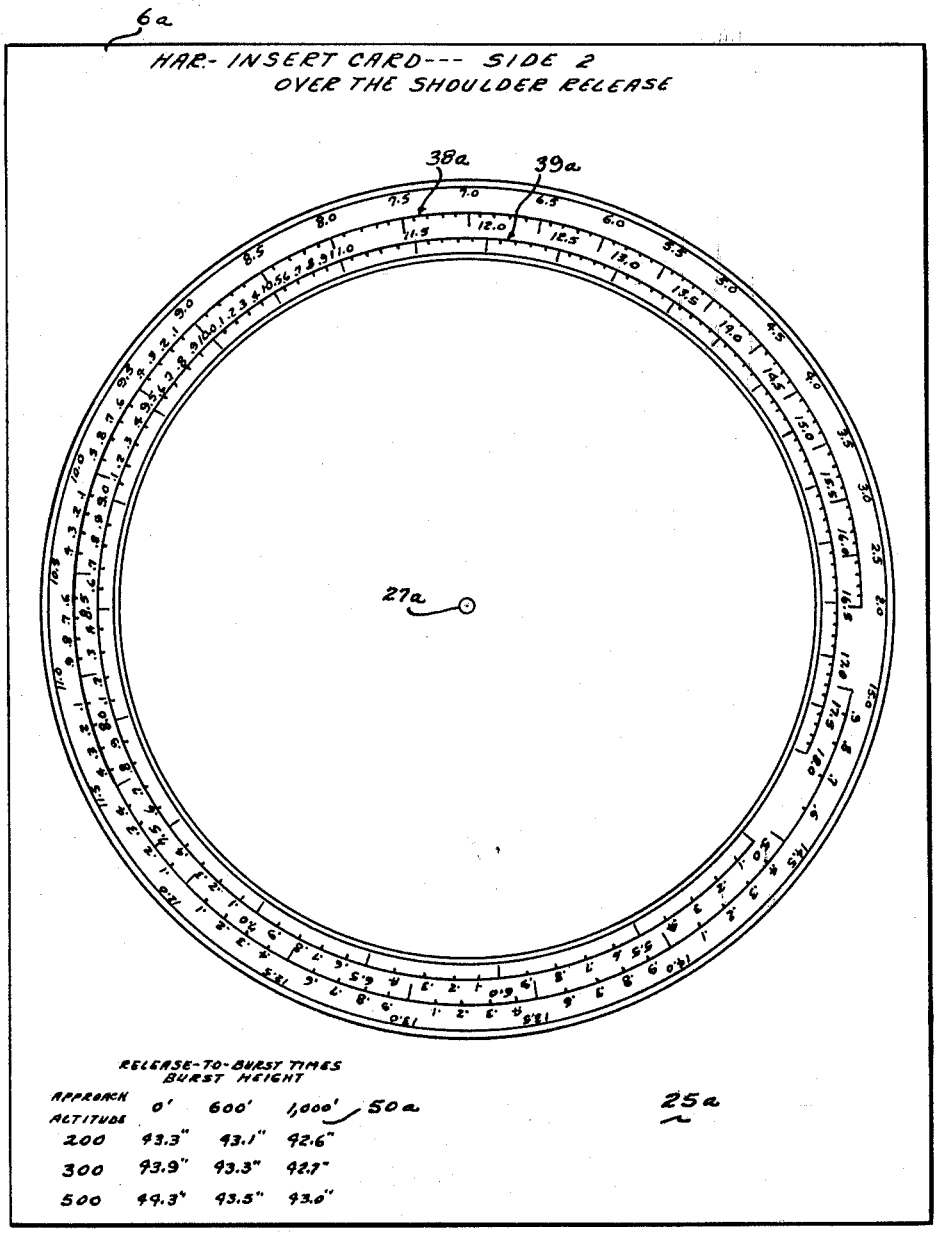
FIGURE 7 is a detail view of the opposite side of the card shown in FIGURE 6.

The same computer is used to plan high angle release variables. Insert cards as shown in FIGURES 6 and 7, somewhat similar to the cards shown in FIGURES 4 and 5, are provided.

Referring to FIGURE 6 this first side $24^a$ of the cards $6^a$ are provided with predetermined nonvariable reference information covering the particular mission planned, such as approach true airspeed at $51^a$; pull-up acceleration in g's at $52^a$, altitude gained pull-up and in addition tabulated corrected release angles for different approach altitudes and different burst heights. This table is indicated at 60. The above are continuously displayed through the transparent panel beyond the periphery of the adjustable wheel or disk. The insert cards $6^a$ having a circular outer ring $28^a$ of pressure mb. indicia surrounding the periphery of the disk 7 and arranged for registration with the pointer 12 at the outer end of the lubber line 11 in the radial window 9, as before described.

Concentrically disposed within the outer scale are a plurality of circular numerical reference scales $29^a$, $30^a$, $31^a$, $32^a$, $33^a$, $34^a$, $35^a$, $36^a$ and $37^a$, each ring disposed to register with the lubber line 11 in window 9 opposite the indexed temperature 10, similar to 29 to 37 before described.

When the arrow 12 is placed on the predetermined pressure indication on scale $28^a$ and the reference figure in one of the scales $29^a$ to $37^a$ which is opposite the temperature indication selected this reference number is noted. The computer is then turned over to disclose the second side $25^a$ of the insert card $6^a$ shown in FIGURE 7, this side having a single circular reference scale $38^a$ disposed concentrically relative to the disk 8 to register in the second window 20 with the gross weight of the aircraft at the target indicia 21 as in the former case. The second side $25^a$ is provided with a concentric ring of gyro release angle setting correction indicia $39^a$ disposed to selectively register with the lubber line 23 in the gyro setting and correction indicating window 22.

In using the computer for a high angle or "over the shoulder" a release, cards of the type $6^a$ are selected for the particular substantially nonvariable conditions of the missions. For instance, the card as shown in FIGURES 6 and 7 is selected in which the calculated approach true airspeed is 900 f.p.s. (feet per second) and the pull-up in g's is 4 g's, as indicated by indicia $51^a$ and $52^a$ (on the first side $24^a$) of the card.

The tabulated release to burst time about $50^a$ supplies the time between the release of the bomb device and the time of burst in seconds, at at least three different approach altitudes, and is calculated for the particular selected conditions of the mission covered by the selected card.

The selected HAR (high angle release) or "Over the Shoulder Release" card is inserted between the transparent panels 1 and 2 as before, with the first side $24^a$ facing the back of the first adjustable disk 7 and the second side $25^a$ facing the second disk or wheel 8. Proper insertion of the card of course disposing the centers $26^a$ and $27^a$ of the concentric reference scales $28^a$, $29^a$ to $37^a$ on side $24^a$ and scales $38^a$ and $39^a$ in concentric relation to the centers of the computer disks 7 and 8.

Assuming airspeed, temperature, weight, number of g's during pull-up, etc., to be the same as before indicated, the first disk 7 is adjusted to dispose the arrow on the forecast pressure on the outer scale $28^a$, for instance at 750 mb. and the reference index number is then noted under the lubber line 11 opposite the temperature indication (40° C.) on the scale $29^a$, the reference number would be 8.42 (when interpolated).

Bomb release altitude is obtained by adding altitude gained in the pull-up (6200') from tabled indicia $54^a$ on side $6^a$ to the actual target altitude, for instance 0' and adding the approach altitude for instance 200', giving a bomb release altitude in this case of 6400'.

The computer is then turned over and the second computer disk or wheel 8 is then adjusted to dispose the gross weight number, for instance 32,000 lbs. on scale 21, at the second window 20 opposite the formally noted reference scale indicia 8.42 on the reference scale 38ª.

The gyro release angle, as before mentioned, is selected according to mission conditions (approach altitude of 200′ and burst height 600′) from the tabulated scale 60 which is continuously visible through the panel 2 beyond the periphery of the disk 8. This setting however required a release angle correction because of pressure, temperature and gross weight variations. This gyro release angle setting correction is noted through the third window 22 opposite the lubber line 23, in this instance being 12.15° which when added to the release angle of 108.4 (for approach altitude of 200′ and 600′ burst height) gives the corrected gyro bomb release angle of 120.55°.

It is also contemplated that the cards can be shaped, for instance, with means so that the card inserts can only be inserted between the panels with the proper sides 24 or 24ª facing the first disk 7 and the opposite sides 25 and 25ª facing the second disk 8.

The above disclosure of the invention is by way of example, it being obvious that the positions of the windows can be changed with a corresponding change in the positions of the values on the reference scales without departing from the spirit of the invention as set forth in the following claims.

We claim:

1. A low altitude bombing indicator device comprising a pair of rectangular transparent base panels, spacer means surrounding three sides of the perimeter of said base panels to fix the said panels in spaced parallel relation to provide a rectangular pocket between the panels for receiving a bombing data predetermined information insert card therein, an opaque circular disk rotatably adjustable on the outer face of each of said transparent base panels in concentric relation to each other arranged to expose a portion of said base panels surrounding the periphery of said disks and continuously expose certain predetermined corelated bombing data on said insert card located outwardly beyond the periphery of said disks, said disks having window openings therein for simultaneously selecting displaying corelated portions of concentric rings of predetermined bombing data on both sides of said insert card located inside the periphery of said disks when said disks are rotatively adjusted to predetermined positions, and a rectangular insert card shaped to fit said rectangular pocket, said insert card having predetermined corelated bombing data located on both sides thereof beyond the periphery of said disks for continuous display through both of said panels outwardly of the periphery of said adjustable disks as said disks are rotatably adjusted to all positions, said insert card having concentric rings of cooperating corelated variable bombing data located on both sides thereon inside the periphery of said disks to be selectively displayed through said windows in the two disks when said disks are rotatably adjusted to predetermined rotative positions on said panels.

2. A bombing indicator device as claimed in claim 1 in which a window on one of said disks has a radial reference means extending outwardly from the center of said disks having variable corelated temperature indicia disposed at different predetermined radial distances from said center, said insert cards being provided with a concentric ring of forecast pressure altitude indicia adapted to be exposed around the circumference of the disk beyond the periphery of said disk for selective registration with said radial reference means and a plurality of concentric corelated rings of predetermined corelated dial setting indicia for the other disk, each ring having predetermined reference indicia radially disposed to register with one of said variable temperature indicia.

3. A bombing computer of the class described for indicating time at a predetermined speed of a bombing aircraft between an initial identification point for a bombing run and a pull-up point in the run and a pull-up bomb release angle comprising, a pair of transparent base panels disposed in spaced parallel relation to receive a bombing table insert card in a predetermined position therebetween, a bombing table insert index card for insertion between said panels in said predetermined position, said card having concentric corelated bombing data on both sides thereof for display through both of said panels, one side including an outer ring of pressure indicating indicia, and a plurality of corelated concentric rings of numerical disk setting indicia for variations in temperatures at the same pressures, the opposite side of said card having an outer concentric ring of related numerical disk setting indicia, a concentric ring of corelated gyro pull-up angle bomb release setting indicia, a concentric ring of corelated initial point to the target indicating indicia for indicating variations between the initial point of the bombing run and the target, and a plurality of corelated concentric rings of timer setting from initial point pull-up indicating indicia for variations in approach altitudes and different bomb burst heights at those altitudes, a first opaque disk on one of said panels adapted to be rotatably mounted in front of the first mentioned side of said index card in concentric relation to the rings of indicia thereon when the card is inserted between the panels, said first disk having a pointer thereon for selective registration with the pressure indicating indicia on the card, and having a radial window opening, radially indexed for registration with said disk setting indicia on the card for variations in temperatures at the same pressures, a second opaque disk rotatably mounted concentrically on the panels in front of second mentioned side of said index card in concentric relation to the rings of indicia thereon when said index card is inserted between said panels, said second opaque disk having a first radial window opening therein indexed circumferentially for indicating gross weight at the target for the aircraft carrying the bombing device, for registration with the corresponding selected disk setting indicia aforesaid to set the second disk in a predetermined relation to the rotative setting of the first disk, said second disk having a second window indexed to register with said predetermined pull-up bomb release angle indicia aforesaid, said second disk having a third radial window opening indexed radially outward for different approach altitudes for the bombing run for different desired burst heights for the bomb, said last window having an indicating pointer for registration with said ring of initial point to target indicating indicia on the last mentioned side of the index card, said last window and pointer disposed for simultaneous indicating registration with said rings of timer setting indicia aforesaid for said different approach altitudes and burst heights.

4. An aircraft bombing computer of the class described for indicating time at a predetermined speed of a bombing aircraft between an initial identification point for a bombing run and a pull-up bomb release angle comprising an index card having concentric corelated bombing data on both sides thereof, one side including an outer ring of pressure indicating indicia and a plurality of corelated concentric rings of numerical disk setting indicia for variations in temperatures at the same pressures, the opposite side of said card having an outer concentric ring of corelated numerical disk setting indicia, a concentric ring of corelated gyro pull-up bomb release angle setting indicia, a concentric ring of corelated initial point to the target indicating indicia for indicating variations between the initial point of the bombing run and the target and a plurality of corelated timer setting from initial point to pull-up point indicating indicia for variations in approach altitudes and different bomb burst heights at those altitudes, a first opaque disk adapted for rotary mounting in front of the first mentioned side of said index card in concentric relation to the rings of indicia thereon, said first disk having a pointer thereon for selective registration with said pressure indicating indicia on the card and having a radial window opening radially indexed for registration with said disk setting indicia on the card for variations in temperature at the same pressures, for determining the setting of a second opaque disk, a second opaque disk adapted for rotary mounting in front of the second mentioned side of said card in concentric relation to the concentric rings of indicia thereon when said second side of said card is disposed in back of said second opaque disk, said second opaque disk having a first radial window opening therein, indexed circumferentially for indicating gross weight at the target for the aircraft carrying the bombing device, for registration with the corresponding selected disk setting indicia aforesaid to set the second disk in a predetermined rotative relation to the rotative setting of the first disk, said second disk having a second window opening indexed to register with said predetermined pull-up bomb release angle indicia aforesaid, said second disk having a third radial window opening, indexed radially outward for different approach altitudes for the bombing run at different desired burst heights for the bomb, said last window having an indicating pointer for registration with said ring of initial point to target indicating indicia on the last mentioned side of said index card, the last window and pointer disposed for simultaneous indicating registration with said rings of timer setting indicia aforesaid for different approach altitudes and different burst heights.

References Cited by the Examiner
UNITED STATES PATENTS 2,427,976  9/47  Posson _____ 235—88
2,628,027  2/50  Baer _____ 235—88

LEO SMILOW, *Primary Examiner.*

F. M. STRADER, C. L. JUSTUS, *Examiners.*